United States Patent [19]

Klefisch

[11] Patent Number: 4,531,631

[45] Date of Patent: Jul. 30, 1985

[54] CONVEYOR BELT

[76] Inventor: Rudolf Klefisch, Siebengebirgsallee 165, 5000 Cologne 41, Fed. Rep. of Germany

[21] Appl. No.: 484,678

[22] Filed: Apr. 13, 1983

[30] Foreign Application Priority Data

Apr. 16, 1982 [DE] Fed. Rep. of Germany ....... 3214009

[51] Int. Cl.³ ............................................. B65G 17/40
[52] U.S. Cl. .................................................. 198/853
[58] Field of Search ............... 198/848, 851, 852, 853, 198/831

[56] References Cited

U.S. PATENT DOCUMENTS 3,268,064  8/1966  Pricenski .............................. 198/851
3,870,141  3/1975  Lapeyre et al. ...................... 198/853

FOREIGN PATENT DOCUMENTS 1602634  3/1970  Fed. Rep. of Germany ...... 198/853
1200324  7/1970  United Kingdom ................ 198/848

Primary Examiner—Jeffrey V. Nase
Attorney, Agent, or Firm—Sprung, Horn, Kramer & Woods

[57] ABSTRACT

The invention relates to a conveyor belt with wire members hinged to one another by means of bars. The members consist of individual chain links which are arranged in succession, transversally to the longitudinal (conveying) direction of the belt, with their longitudinal extension in the longitudinal direction of the belt parallel to and at a distance from one another which is somewhat greater than the thickness of a chain link, and are connected to one another by at least one continuous welded seam.

3 Claims, 2 Drawing Figures

CONVEYOR BELT

BACKGROUND OF THE INVENTION

The invention relates to a conveyor belt formed from individual chain links which are arranged with their longitudinal extension in the longitudinal direction of the belt to form members parallel to and at a distance from one another, the chain links of adjacent members being inserted partially into one another and being hinged to one another by means of bars inserted through the aligned orifices.

Such conveyor belts are used, for example, for transporting annealing through a furnace. Conveyor belts consisting of wire mesh are used for relatively lightweight materials. The conveyor belts used for heavier material are those, the members of which consist of wire coiled alternately to the right and left, forming an oval orifice cross-section, or of conventional oval chain links, and successive members are inserted partially into one another by means of the convolutions and are hinged to one another by means of a bar inserted through the aligned orifices (German Journal "dhf" 9/76, pages 59-62, 65). The disadvantage of these known conveyor belts is that they move with difficulty as a result of the friction against one another and because of distortion resulting from the effects of heat.

The object on which the invention is based is to provide conveyor belts which can be produced cheaply and can support heavier loads and which still move easily even under the effects of heat.

SUMMARY OF THE INVENTION

To attain this object the invention provides a conveyor belt wherein the chain links forming the belt members are arranged in succession, transversally to the longitudinal direction of the belt, at a parallel distance from one another, which is somewhat greater than the thickness of a chain link, and are connected to one another by at least one continuous welded seam. In the conveyor belt according to the invention, each member consists of a plurality of straight chain links which are aligned in the conveying direction and are arranged in succession transversally thereto and which are connected to one another by means of a welded seam laid transversally to the conveying direction. The distance between the chain links of a member of the conveyor belt is somewhat greater than the thickness of the chain link (the diameter of the wire forming the chain link). Because of this distance between the individual chain links, successive members of the conveyor belt are connected so as to move easily. The individual members are partially pushed into one another to connect them to one another, and a jointed bar is pushed through the aligned orifices, the projecting ends of this jointed bar being widened or being provided with a screwed-on nut so that the bar is prevented from slipping out inadvertently.

Round wire or wire of any profile can be used for the chain links.

Because a pitch is avoided when the members of the conveyor belt are formed from wire, no distortion which impairs ease of movement occurs as a result of the effects of heat. Even after being used for a relatively long time under relatively high temperatures, the conveyor belt according to the invention moved as easily as it did at the beginning.

When chain links bent from wire are used, according to an advantageous design of the conveyor belt according to the invention the joining points or gaps between the chain links are closed continuously by the connecting welded seam. In this way, the welded seam performs two functions, namely, on the one hand, connection of the chain links to one another and, on the other hand, connection across the gap in the individual chain link.

The members of the conveyor belt according to the invention can be produced in an economically favourable way by connecting to one another by means of the welded seam the chain links, arranged in succession and at a distance from one another, during a relative movement between the chain links and a welding device. In this way, chain links of any length can be produced and, if appropriate, severed in desired lengths.

DESCRIPTION OF THE DRAWINGS

The drawing illustrates the construction of the conveyor belt according to the invention.

DETAILED DESCRIPTION OF THE INVENTION

Figure 1:
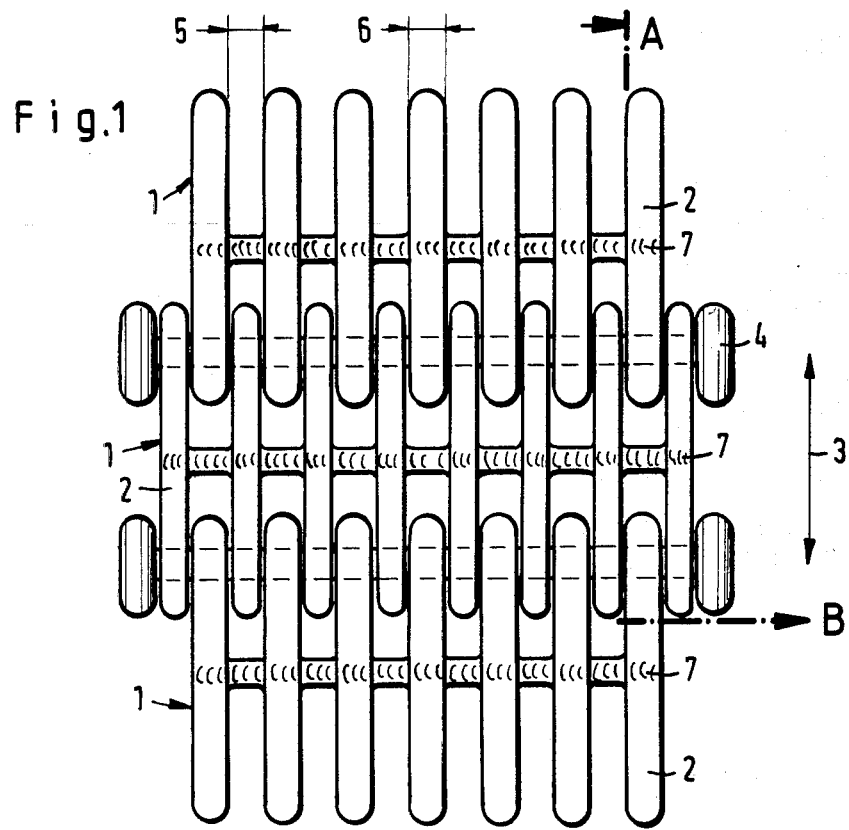
FIG. 1 shows, in a planned view, three interconnected members of the conveyor belt.

FIG. 1 shows three members 1, one of which is formed from eight chain links 2 and the other is formed from seven chain links 2. The chain links 2 are aligned with their longitudinal extension parallel to the conveying direction 3. The chain links 2 of a member 1 of the conveyor belt are parallel to one another at a distance 5 which is somewhat greater than the thickness 6 of a chain link 2. The chain links 2 of each member 1 are connected to one another by a continuous welded seam 7 extending transversally to the longitudinal (conveying) direction 3 of the belt. The chain links 2 are combined into the constructional unit of the member 1 by means of one or more welded seams 7.

Figure 2:
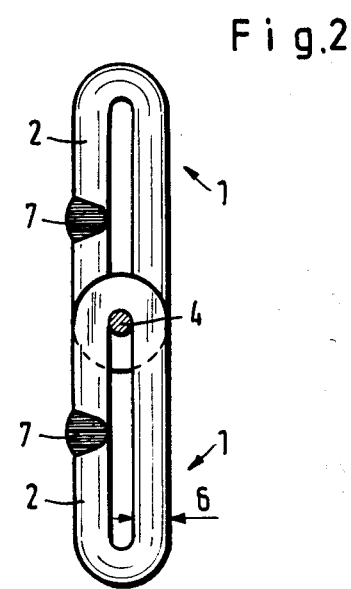
FIG. 2 shows a section along the line A-B in FIG. 1.

As shown in FIG. 2, the gap in each chain link forming wire can be closed by the welded seam.

The successive members 1 of the conveyor belt are inserted into one another until a jointed bar 4 can be inserted through the aligned orifices in the chain links 2. The jointed bar 4 is widened at its ends, so that it cannot slip out inadvertently.

I claim:

1. Conveyor belt formed from individual chain links which are arranged with their longitudinal extension in the longitudinal direction of the belt to form members parallel to and at a distance from one another, said chain links are formed from a piece of wire bent such that one end of the wire is adjacent to the other end of the wire with a gap between each end, the chain links of the adjacent members being inserted partially into one another and being hinged to one another by means of bars inserted through the aligned orifices, wherein the chain links forming the belt members are arranged in succession, transversally to the longitudinal direction of the belt, at a parallel distance from one another, which is somewhat greater than the thickness of a chain link, and are connected to one another by at least one continuous welded seam laid so that it closes the gap of the wire forming the chain link.

2. A conveyor belt according to claim 1, wherein said wire has a round profile.

3. A conveyor belt according to claim 1, wherein each bar is widened at its ends so that the bar cannot slip out from the links.

* * * * *